Jan. 8, 1963 W. G. FALTIN 3,072,245
TISSUE AND LITTER CONTAINER
Filed July 16, 1959 3 Sheets-Sheet 2
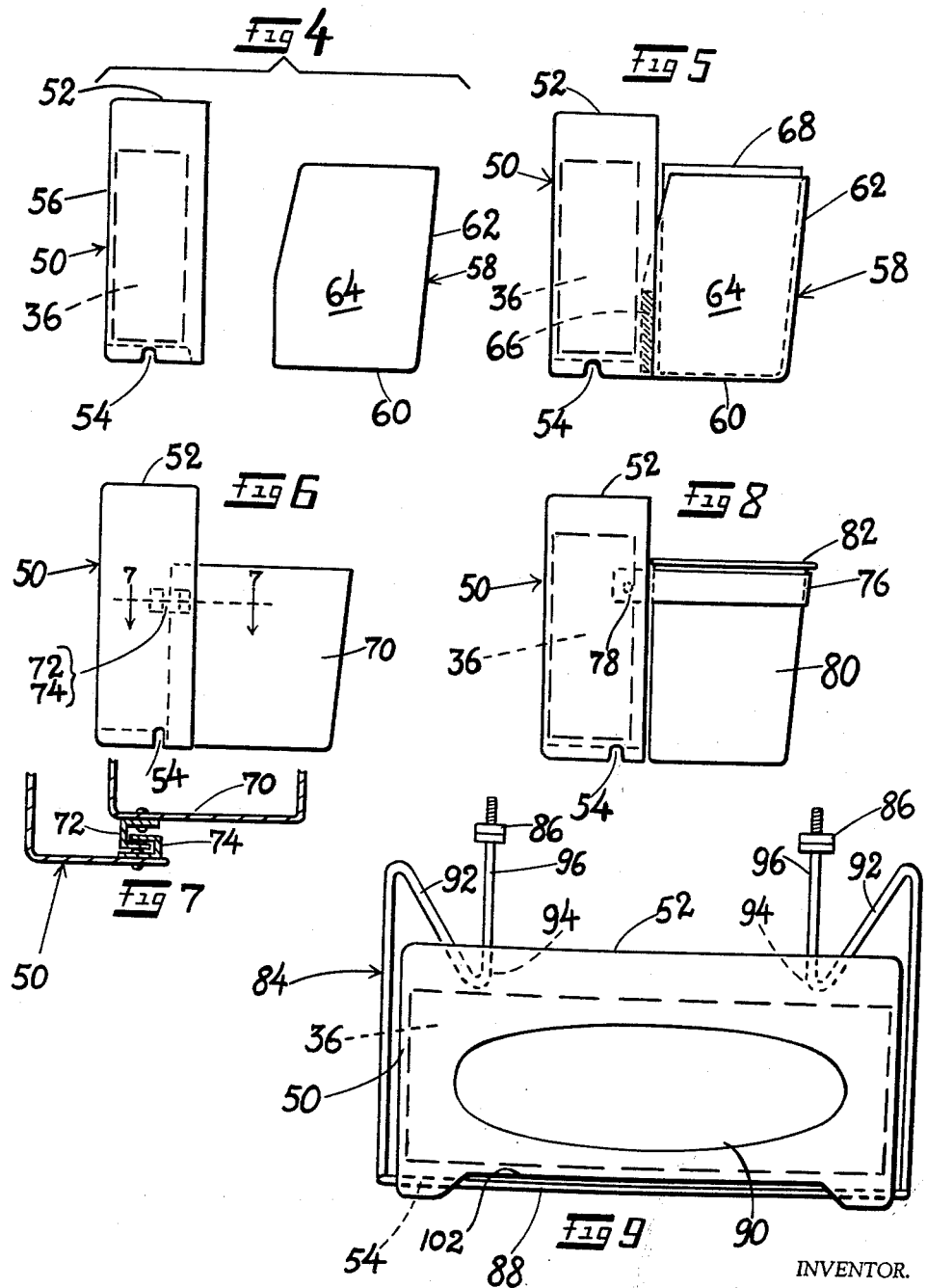
INVENTOR.
William G. Faltin
BY
ATTORNEY

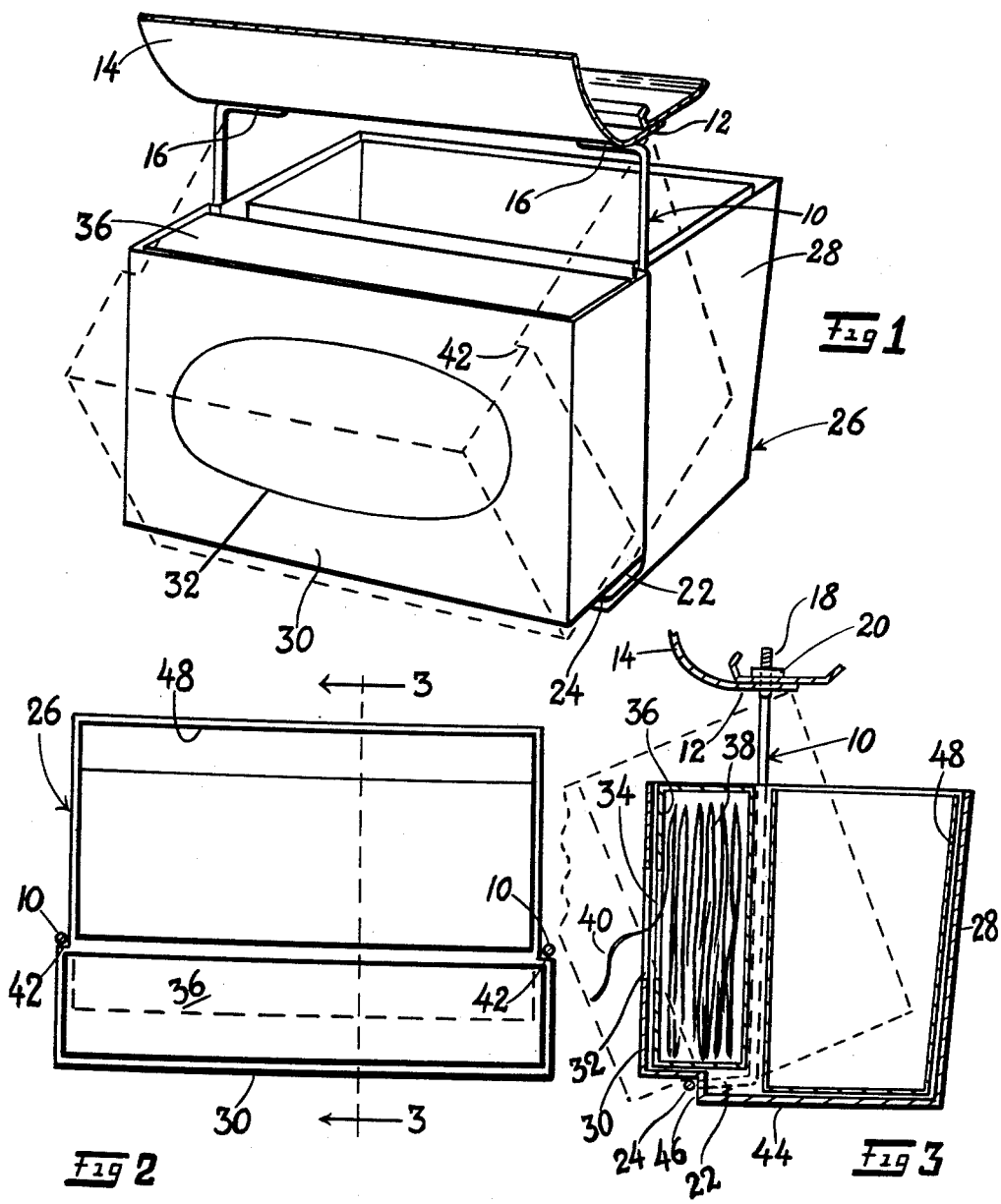

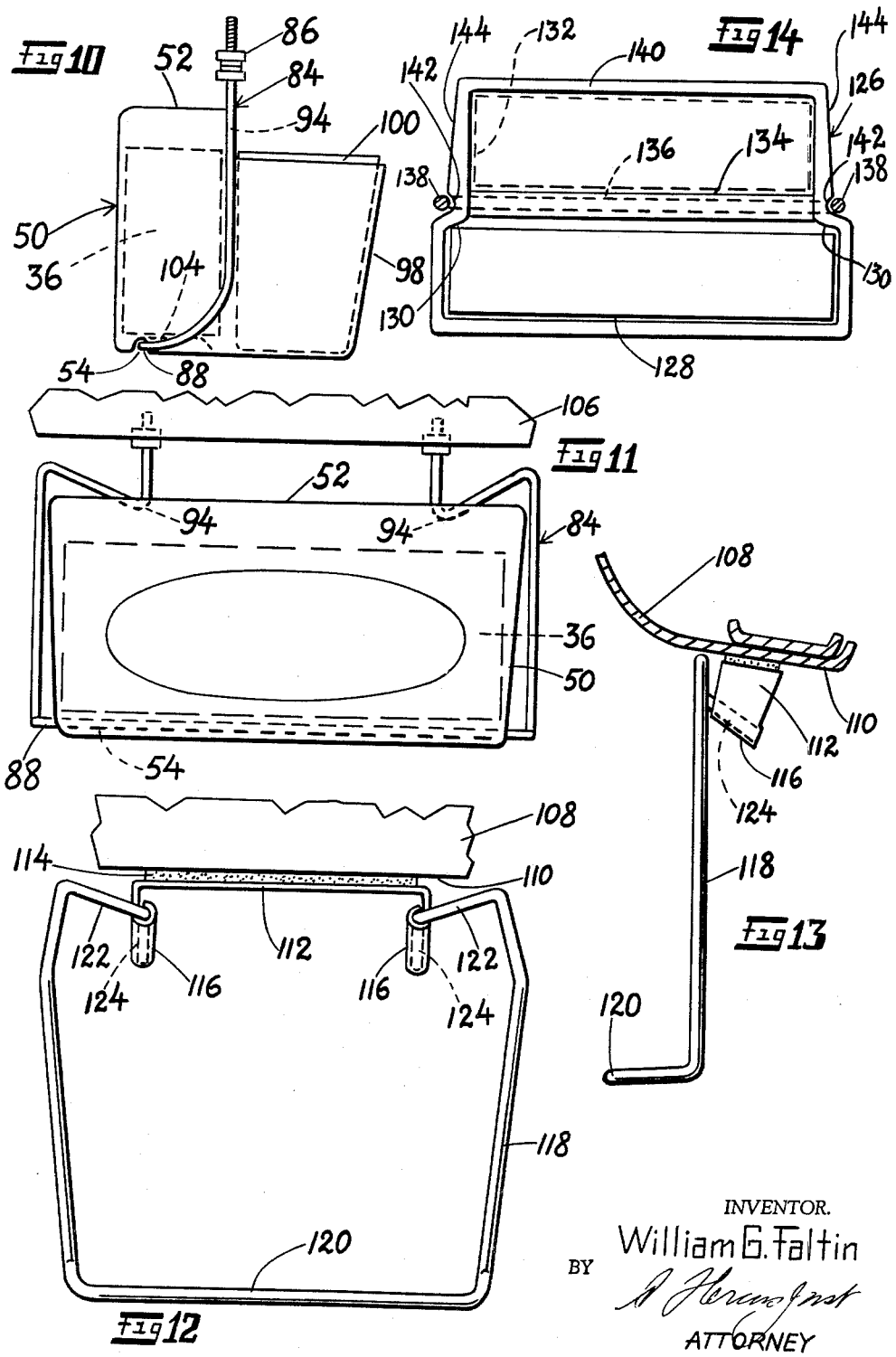

United States Patent Office 3,072,245
Patented Jan. 8, 1963

3,072,245
TISSUE AND LITTER CONTAINER
William G. Faltin, Box 13682, York, Pa.
Filed July 16, 1959, Ser. No. 827,522
4 Claims. (Cl. 206—19.5)

This invention relates to a combination tissue and litter container and, more particularly, to such type of container which readily and quickly is connectable to the dash of a vehicle such as an automobile, truck, or the like, for purposes of holding a carton or package of tissues convenient for use, and following such use of such tissues, the same and any other form of litter normally originating during travel, such as empty cigarette packs, orange peels, and the like, may readily be placed within the litter container portion of the unit which is mounted upon the dash of a vehicle.

It has been proposed heretofore to use various types of holding means to support a carton of tissue at various locations in a vehicle such as on the sun visor, the top of the dash, on the steering column, and at other relatively accessible locations. It also has been proposed to provide various types of litter bags and similar forms of holding means for litter, said bags and the like being mounted at any convenient location in a vehicle. Usually however, the mounting of a litter bag of such type as has been referred to above renders the interior of a vehicle quite unsightly. Further, many litter bags of the type commonly used at present do not have ready means for holding the top of the litter bag open for the ready reception of litter.

It is the principal object of the present invention to provide a combined tissue holder and litter container, whereby space is economized, only a single mounting means is required to hold both a tissue carton and litter container and the litter containing portion of the unit is arranged relative to the tissue containing portion of the unit so as to be put out of sight except when it is desired to place litter within the litter containing portion of the unit. Under such latter conditions, the container unit is movable, preferably pivotally, so as to render the receiving portion of the litter container readily available for the reception of litter, following which the container preferably moves by gravity to retracted position, in which position the tissues are available for ready removal from the unit for use and do not present an unsightly appearance.

Another object of the invention is to provide a plurality of different embodiments of constructions having various benefits over each other, in different combinations, all of said embodiments however including a tissue carton-receiving portion and a litter container, either lined or unlined, as well as mounting means which permit movement of the connected tissue carton holder and litter container from a normal position in which only the tissues are seen by the occupants of the vehicle, to a litter-receiving position to which the connected unit is readily moved when it is desired to dispose litter within the container.

A further object of the invention is to provide different details of mounting and supporting means, as well as various types of mechanisms to render the connected unit pivotally supported as well as preferably gravity operated for movement from the normal or tissue-dispensing position, to the litter receiving position, and vice versa.

Still another object of the invention is to provide various means for rendering the tissue and litter container readily removable from bracket-type supporting means such as when it is desired to empty the litter receptacle or replace any exhausted carton of tissues, as well as also provide movement-limiting means which not only restrict the amount of forward movement of the unit to litter-receiving position as well as movement in retracting direction until the normal position is reached and in which position only the tissues are available.

Details of the foregoing objects and of the invention, as well as other objects thereof, are set forth in the following specification and illustrated in the accompanying drawings comprising a part thereof.

In the drawings:

FIG. 1 is a perspective view showing one embodiment of exemplary tissue and litter container construction embodying the principles of the present invention and being illustrated in full lines as supported in its normal position, depending from a fragmentarily illustrated portion of a vehicle dash, while in broken lines, the forwardly tilted position of the tissue and litter container is illustrated to show the litter container portion thereof in position to receive litter.

FIG. 2 is a top plan view of the combination tissue and litter container, as well as a sectional portion of the supporting means therefor as illustrated in FIG. 1.

FIG. 3 is a transverse sectional view taken on the line 3—3 of FIG. 2.

FIG. 4 is an exploded end elevation showing a different embodiment from that illustrated in FIGS. 1 and 3 and in which the portion of the container for holding a tissue carton is shown as being manufactured independently from the litter container portion of the unit.

FIG. 5 is a view similar to FIG. 4 but showing the two portions of the unit united by one exemplary embodiment of uniting means comprising cement.

FIG. 6 is a view similar to FIG. 5 but showing a slightly different embodiment of litter container connected to a container for a carton of tissues similar to that shown in FIGS. 4 and 5 but in which hook-like connecting means are utilized to separably connect the litter container and tissue carton holding means of the unit.

FIG. 7 is an enlarged transverse sectional view showing details of the hook-like connecting means embodying FIG. 6, as seen on the line 7—7 of FIG. 6.

FIG. 8 is a view similar to FIGS. 5 and 6 but illustrating a still further embodiment of holding means for connecting a litter container to a container for holding a carton of tissues in accordance with the principles of the present invention.

FIG. 9 is a front view showing a holder for a tissue carton such as included in any of the embodiments shown in FIGS. 4 through 8, and illustrating said container in supporting position relative to a bail-type bracket means connectable at the upper end thereof to the dash of a vehicle, portions of the legs of the bracket means being shown to be shaped to serve as a stop for limiting the movement of the litter container and tissue holder in retracting direction, as well as forwardly.

FIG. 10 is a side elevation of the container and bracket means assembly shown in FIG. 9.

FIG. 11 is a view similar to FIG. 9 but showing a slightly different form of bracket means illustrated as being connected to a fragmentarily-shown portion of the dash of a vehicle and the bottom portion of the container being shaped slightly differently from that of the container shown in FIG. 9.

FIGS. 12 and 13 respectively are front and side elevations of still another embodiment of bracket means connected to a fragmentarily-illustrated portion of the dash of a vehicle, this embodiment of bracket means employing a holder attachable to the dash of a vehicle, said holder and bracket means having interfitting socket and projecting means permitting ready connection and disconnection of the same to and from the holding means connected to the dash of a vehicle.

FIG. 14 is a top plan view of still another embodiment of container having positioning means different from those in the preceding embodiments.

In the preferred embodiment of the invention, a bail-type bracket 10 is connected by any suitable means to, preferably, the horizontal lower portion 12 of the dash 14 of any vehicle such as an automobile, truck, or the like. In the embodiment shown in FIGS. 1 through 3 for example, the upper ends 16 are bent so as to be substantially horizontal and therefore form a stop means to limit the projection of the tip ends 18, see FIG. 3, of the bracket means 10 through the portion 12 of the dash 14. Any suitable type of fastening means such as a conventional threaded nut 20 or a so-called "speed-nut," may be used to secure the bracket means 10 to the dash 14.

The side legs of the bail-type bracket 10 have forwardly extending lower portions 22 best shown in FIG. 3, and the outer ends of said portions 22 are connected by a horizontal portion 24 which comprises a pivotal support for the tissue and litter container unit now to be described.

The tissue and litter container unit 26 has a rearward, litter-containing portion 28 and a forward tissue carton container 30. The front face of the latter is provided with a dispensing opening 32 which, preferably, is oval in shape as shown in FIG. 1 in order to be coincident with the dispensing opening 34 of the tissue carton 36 best shown in FIG. 3 in sectional manner. The folded and/or interleaved tissues 38 likewise are shown in said view, with the leading fold 40 of the outermost tissues projecting through the aligned dispensing openings 32 and 34 as clearly shown in FIG. 3.

The upper wall of the carton container 30 is illustrated as being open in FIGS. 1 and 3 but it is to be understood that the same may be closed either by an integral wall or by a cap member or wall affixed by a subsequent operation, such as by cementing, or the like, if desired. Having the upper wall of the tissue container 30 open however permits ready insertion of the tissue carton 36 and removal thereof from the carton container 30, it being understood that the tissue carton 36 is inserted within the container 30 with the dispensing opening 34 forward and in alignment with the dispensing opening 32 of the carton container 30. A removable cover may also be used above container 30.

In the embodiment of tissue and litter container 26 shown in FIGS. 1 through 3, it will be seen particularly from FIG. 2 that the side walls have an offset 42 therein to provide shoulders which are engageable with the vertical legs of the bracket 10. The bottom 44 of the tissue and litter container unit 26 also has a horizontal offset 46 which is engaged by the horizontal portion 24 of the bracket 10, whereby between the latter engagement and that of the vertical legs 10 of the bracket with the vertical offsets 42 of the tissue and litter container unit 26, the latter unit is maintained normally in the retracted position shown in FIG. 1 relative to the bracket 10, due primarily to the fact that the pivot line of the horizontal portion 24 of bracket 10 is forward of the center of gravity of the tissue and litter container unit 26. In such position, which is referred to as the normal position, as illustrated in full lines in FIGS. 1 and 3, the front wall of the tissue carton container 30 will be substantially vertical, whereby the leading fold 40 of the outermost tissue readily is engageable by anyone desiring to withdraw it from the carton 36. However, due to the pivotal supporting of the unit 26 upon the horizontal bar portion 24 of the bracket 10, it is a simple matter to engage the top portion of the tissue carton container 30 for example and pull the same forwardly about the axis of the horizontal rod portion 24 of the bracket 10 so as to tilt the unit 26 forwardly to the dotted line position thereof shown respectively in FIGS. 1 and 3, whereby the rearward, litter containing portion 28 is exposed for the reception of litter therein as readily can be visualized especially from FIG. 1. Gravity will maintain the container in this position.

The portion 28 may either contain a relatively short bag-type liner 48 if it is desired to maintain the interior of the litter-receiving portion 28 clean. If desired, the liner 48 may be made from moisture resistant paper or similar suitable sheet material, resinous or otherwise, or the same may be formed from relatively rigid material such as a suitable resin, so as to be shape-retaining. However, in order to maintain the carton 36 in place within the forward tissue carton container 30, it will be noted that the ends of the carton 36 preferably engage the shoulders formed by the offset 42 in the sides of the unit 26. After the unit 26 has been tilted forwardly to the dotted line position thereof shown in FIGS. 1 and 3, for example, for purposes of receiving litter within the rear compartment 28, it either may be released to fall back to the full line position thereof shown in FIGS. 1 and 3 due to the action of gravity, or especially if the unit 26 is made from relatively light weight material, the person using the unit may hold onto the same while gravity is moving the unit back to the full line position thereof. Under normal circumstances however, it is preferred that the unit 26 be made from relatively strong and rigid material such as being molded from suitable resin stock, whereby adequate strength is provided. Particularly if the offsets 42 and 46 are made to be somewhat substantial such as of the order of 3/8 of an inch or slightly more, it is not necessary to be extremely precise in molding the unit 26, or in controlling the formation of the bracket 10 within very precise limits. By not requiring the use of precise measurements in the formation of either the container unit 26 or the bracket 10, cost of manufacturing can be maintained at a minimum. Further, additional saving in cost in the manufacture of the container unit 26 from resin material may be effected by using either a pressure or vacuum method for forming the container 26 from sheet resin material, such technique involving the draping of the pre-heated sheets of such resin material over the exterior of a vacuum mold or across the open top of either a pressure or vacuum mold, following which the edges of the container 26 may be suitably trimmed. Such technique also results in the formation of an attractive container unit, which may be either molded from material of desired colors or suitable finishing colors may be produced by spray painting the container unit or the like.

It is contemplated in the embodiment of the invention shown in FIGS. 1 through 3 that the container unit 26 preferably be made integral with respect to the carton container portion 30 and the litter containing portion 28. However, it is possible to manufacture the unit from separate portions which then either may be permanently or detachably connected together. Certain embodiments exemplifying this latter type of construction are shown in FIGS. 4 through 8, details of which will now be described.

The same embodiment is shown respectively in FIGS. 4 and 5 in exploded and assembled relationship of the several components comprising the embodiment. Referring to FIG. 4, for example, it will be seen that the tissue container unit 50 is similar to the tissue carton container 30 of the embodiment shown in FIGS. 1 through 3 except that it has a closed top 52. However, the bottom wall is suitably shaped to provide a longitudinally extending notch or recess 54. The front wall 56 is provided with a dispensing opening therein similar to that shown in the embodiment illustrated in FIGS. 1 and 3. The litter containing portion 58 has a bottom wall 60, back wall 62 and ends 64 having upper edges which preferably slope upwardly from front to rear as clearly shown in FIGS. 4 and 5. The front of the portion 58 is open either fully or partially. To assemble the portion 58 with the tissue container unit or portion 50, it is merely necessary to use cement 66 on the overlapping portions of the ends 64 and the end walls of the tissue container portion 50, such cement being illustrated somewhat diagrammatically in FIG. 5. Cement will permanently attach the two portions together so that they then comprise a unit similar to the unit 26 in the embodiment illustrated in FIGS. 1 through 3. A carton of tissues readily may be placed within the portion 58 and moved forwardly into the portion 50 so as to coincide the dispensing opening thereof with the dispensing opening of the portion 50. Then, if desired, either a rigid or paper-like receptacle 68 may be placed within the portion 58, not only to receive litter, but also to retain the tissue carton within the portion 50.

In the embodiment illustrated in FIGS. 6 and 7, the tissue container portion 50 is basically the same as that shown in FIGS. 4 and 5, the same being provided with a longitudinally extending notch or recess 54 which receives the lower portion of a bail-type bracket to pivotally support the container unit relative to the dash of a vehicle. However, the embodiment shown in FIG. 6 utilizes a litter receptacle portion 70 which either may have an open or closed front, as desired, the particular illustration shown in FIGS. 6 and 7 indicating a closed front. The principal reason for including the embodiment shown in FIGS. 6 and 7 is to illustrate the manner in which detachable connecting means comprising interengaging hooks 72 and 74 respectively may be secured by rivets or otherwise to side walls of the tissue container portion 50 and the litter receptacle portion 70, such hook-like means and the manner of engaging each other being shown in somewhat exaggerated fashion in FIG. 7, on a larger scale than that employed in FIG. 6. It is to be understood that the litter receptacle portion 70 readily may be disconnected from the tissue container portion 50 when it is desired either to place a new carton of tissues within the portion 50 or to remove litter from the portion 70. It will be understood that, if desired, a suitable, removable liner such as a paper bag of correct size, may be placed within the litter receptacle portion 70.

In the embodiment shown in FIG. 8, there is a tissue container portion 50 which is similar to that shown in the embodiments respectively illustrated in FIGS. 4 and 5, and FIG. 6. However, secured to the rear open face thereof is a substantially U-shaped strap 76, the ends of which are secured by rivets 78 or otherwise to the side walls of the tissue container portion 50. Placed within the U-shaped strap or bail arrangement 76 is a preferably rigid litter receptacle 80, having marginal flanges 82 which limit the insertion movement of the receptacle 80 within the strap arrangement 76. The receptacle 80 may be used either in its illustrated condition, without a liner, or a liner may be placed therein to immediately contact the litter therein, if desired. By tilting the assembled unit shown in FIG. 8 forwardly relative to the pivot notch 54, access to the receptacle 80 readily is gained, as well as such access permitting the removal of any liner from the receptacle 80 which may be therein when it is desired to empty the same. However, for emptying purposes, it is preferred that the entire unit be removed from its pivotal support.

FIG. 9 illustrates a combination of tissue and litter container unit 50, in which only the tissue container-portion face is seen, and a bail-type bracket 84, the upper ends of which are provided with nuts 86 or the like, by which the bracket 86 may be secured to the dash of a vehicle. It will be seen that the notch or recess means 54 in the portion 50 receive the lower horizontal intermediate portion 88 of the bracket 84 to pivotally support the tissue and litter container unit relative to the bracket. The preferably oval dispensing opening 90 in the front face of the tissue container 50 is illustrated in FIG. 9. The side legs of the bail-type bracket 84 are provided with downwardly extending portions 92 to provide depending stop portions 94, such portions 94 also being formed by the upwardly extending connecting portions 96. By reference to FIG. 10 particularly, it will be seen that the depending stop portions 94 are arranged to be engaged by the rear edge of the upper wall 52 of the forward tissue container portion 50 of the entire tissue and litter container unit when said unit is mounted in the normal or vertical position thereof such as illustrated in FIGS. 4 through 6 and 8, as well as in FIG. 10. However, the entire tissue and litter container unit readily may be moved forward pivotally to expose the open upper end of the litter receptacle of any of the various embodiments illustrated in FIGS. 4 through 8.

In FIGS. 10 and 11 a slightly different embodiment of pivotal supporting means is shown between the bracket 84 and the combined tissue container 50 and litter receptacle 98 which may, if desired, contain either a rigid or paper-like liner receptacle 100. Whereas in the embodiment shown in FIG. 9, there is a central raised portion 102 in the bottom wall of the tissue container portion 50, in the embodiment shown in FIGS. 10 and 11, there is also a central raised portion 104 in the bottom wall of the tissue container portion 50 but said central raised portion is entirely rearward of the notch or recess 54 which extends in its entirety longitudinally of the bottom wall of the tissue container portion 50 so as to receive the horizontal portion 88 of the bracket 84.

The embodiments shown in FIGS. 10 and 11 also rely upon depending stop portions 94 to limit retracting movement of the tissue and litter container unit relative to the bracket 84, said depending stop portions 94 engaging the rearward edge of the top wall 52 of the tissue container portion 50. FIG. 11 also illustrates a portion 106 of the dash of a vehicle and the manner in which the bracket 84 is connected thereto.

FIGS. 12 through 13 illustrate a still further embodiment of bracket construction, it being understood that the bracket illustrated in said figures otherwise is adapted to contain any of the various tissue and little container units illustrated in the foregoing specific embodiments. Referring to FIGS. 12 and 13, it will be seen that a fragmentary portion 108 of the dash of a vehicle and especially the horizontal lower portion 110 thereof has a holder 112, which may be made from metal or otherwise, attached thereto by any suitable means such as either a flexible sheet of rubber 114, for purposes of absorbing vibration, which sheet may be affixed respectively to the holder 112 and the outer surface of horizontal portion 110 of the dash by appropriate cement, or otherwise. Opposite ends of the holder 112 are bent downwardly and terminated in preferably downwardly and rearwardly extending socket portions 116. The bail-type bracket 118 has a central lower portion 120 comprising a pivotal axis of the tissue and litter container units to be mounted thereon, and the upper ends of the side legs thereof are bent inwardly as shown at 122 in FIG. 12, the terminal ends of the inwardly bent portions 122 being further bent to provide supporting projections 124 which are received respectively in the socket portions 116 of the holder 112, preferably by slight friction fit. Such arrangements provide for ready means of quickly attaching and detaching the bracket 118 to and from the dash 108.

In FIG. 14, there is illustrated, in top plan view, a tissue and litter container unit 126 which is similar to the embodiment illustrated in FIGS. 1 through 3 in regard to receiving a carton 128 of tissues in a longer front compartment which provides offset corners 130 to position the carton 128 against rearward movement within said longer compartment. The rearward compartment may receive a disposable and replaceable bag-like receptacle or liner 132 for litter. The bottom of the unit has a longitudinal interior rib 134 which is hollow from the lower surface to provide a longitudinal notch within which is received from the bottom the horizontal portion 136 of a bail-type bracket 138, the upper ends of which are attachable to the dash of a vehicle, as in regard to the preceding embodiments.

The rib 134 is not necessarily disposed forwardly of the center of gravity of the unit 126 as with respect to the notches of the above described embodiments which preferably are forward of the center of gravity of the units. The rib 134 may be central of the unit or even somewhat rearward of the center of gravity and in order to maintain the unit readily in its normal operative position, the upper rim of unit 126 has a flange 140 extending preferably around the periphery thereof for strength and also to provide means to receive notches 142 in opposite sides of the unit, preferably vertically above the rib 134, to receive respectively the vertical legs of the bail-type bracket 138.

The unit 126 preferably is formed from synthetic resin which is resilient and at least somewhat pliable, whereby snapping of the notches 142 into engagement with the vertical arms of the bracket and removing them from such engagement readily is achieved incident to pivotally moving the unit 126 backward and forward at the top relative to the axis of rib 134 and the longitudinal notch formed thereby on the bottom of the unit. As a result of the reasonable rigidity of the material from which unit 126 is formed, the notches 142 are quite capable of holding the unit 126 positioned operatively relative to bracket 138 in either the upright position, in which notches 142 receive the vertical legs of bracket 138, or the forward position in which the litter receiving compartment is exposed for receiving litter. To facilitate restoring the unit 126 to the normal, upright position from that just described, the side flanges are bevelled at 144 to cam the flanged sides inward and thereby permit the notches to engage the vertical legs of the bracket 138.

While the various embodiments illustrated herein have similar functions and various attributes and advantages, it is to be understood that they are not the absolute equivalent of each other in that certain of the embodiments have manufacturing or installation advantages over other embodiments and certain embodiments thereof may be more suitable for application to one type of vehicle than another and vice versa. The various suggested materials from which the different components of the several embodiments may be made is not to be regarded as restrictive, metal and resin respectively being the preferred materials from which the various components may be made however.

While the invention has been described and illustrated in its several preferred embodiments, and has included certain details, it should be understood that the invention is not to be limited to the precise details herein illustrated and described since the same may be carried out in other ways falling within the scope of the invention as claimed.

I claim:

1. A litter container having front and rear and side walls and arranged for connection generally in depending manner from the substantially horizontal portion of the dash of a vehicle and at least a portion of the top of said container being open, a bail-shaped bracket connectable at the upper end thereof to said horizontal portion of a dash panel of a vehicle and substantially depending therefrom, said container having means on the normally lower portion forward of the center of gravity thereof relative to the front of said dash and engageable with the lower portion of said bracket and operable to pivotally support and normally retain said container by gravity in retracted rearward position beneath said dash but movable at the upper end forwardly from said dash to expose the open top portion thereof for the reception of litter and the like, and stop means on at least one side wall of said container projecting therefrom and engageable with at least one of the side legs of the bail-shaped bracket when said container is in retracted position to limit the movement of said container in retracting direction.

2. A litter container arranged for connection generally in depending manner from the dash of a vehicle and at least the rearward portion of the top of said container relative to the front of said dash being open and the front wall having a dispensing opening therein, and said portion having disposed therein a carton of tissues engaging the front wall of said container to expose the tissue dispensing opening thereof through the dispensing opening in the front wall of said container, whereby individual tissues may be removed therethrough from said carton, said carton being spaced in use from the rear wall of said container, supporting bracket means connectable at the upper end thereof to a dash panel of a vehicle and depending therefrom, connecting means on said bracket means engaging said container to support said container beneath said dash, and a relatively rigid receptacle open at the top thereof and inserted into the space in the rearward portion of said container substantially against said tissue carton to retain the latter in operative position within said container, the open top of said receptacle being exposed for the reception of litter.

3. The litter container set forth in claim 2 further characterized by said container having notch means on the bottom thereof and said bracket means being bail-shaped and the ends of the legs thereof being uppermost and connectable to the dash of a vehicle, the connection portion of the legs of said bail-shaped bracket means being substantially horizontal in use and received within said notch means of said container to pivotally connect said bracket means and container.

4. A litter container arranged for connection generally in depending manner from the dash of a vehicle and having a bottom portion and at least a portion of the top of said container being open, supporting bracket means having normally substantially vertical means connectable at the upper end thereof to a dash panel of a vehicle and also having a transversely extending lower portion, said container having means on said bottom portion thereof forward of the center of gravity relative to the front of said dash panel and engageable pivotally with said transversely extending lower portion of said bracket means and operable by gravity normally to retain said container in rearward retracted position relative to said dash but movable at the upper end forwardly relative to said dash to expose the open top portion thereof for the reception of litter and the like, and stop means on said container engageable with said vertical means on said bracket to limit the rearward movement of said container to its retracted position.

References Cited in the file of this patent

UNITED STATES PATENTS

| 2,256,204 | Jameson | Sept. 16, 1941 |
| 2,673,056 | Manetti | Mar. 23, 1954 |
| 2,778,553 | Satrom et al. | Jan. 22, 1957 |
| 2,887,216 | Hargraves | May 19, 1959 |
| 2,926,834 | Kaslow | Mar. 1, 1960 |

FOREIGN PATENTS

| 464,373 | Great Britain | Apr. 16, 1937 |
| 1,028,540 | France | Feb. 25, 1953 |